(12) United States Patent
Lang et al.

(10) Patent No.: US 8,402,997 B2
(45) Date of Patent: *Mar. 26, 2013

(54) FLUID FLOW CONTROL COCK FITTED WITH A LEVER HAVING SEVERAL STABLE POSITIONS

(75) Inventors: Daniel Lang, Paris (FR); Alain Taillandier, Paris (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/252,803

(22) Filed: Oct. 4, 2011

(65) Prior Publication Data

US 2012/0261425 A1    Oct. 18, 2012

Related U.S. Application Data

(63) Continuation of application No. 10/487,330, filed as application No. PCT/FR02/02844 on Aug. 9, 2002, now Pat. No. 8,056,580.

(30) Foreign Application Priority Data

Aug. 23, 2001 (FR) .................................. 01 11042

(51) Int. Cl.
*F16K 37/00* (2006.01)
*F16K 1/30* (2006.01)
*F17C 13/02* (2006.01)
*F17C 13/04* (2006.01)

(52) U.S. Cl. .......... 137/557; 137/375; 251/98; 251/244; 251/263

(58) Field of Classification Search .................. 137/375, 137/377, 382, 557; 251/89, 93, 98, 99, 244, 251/259, 263, 277, 278

See application file for complete search history.

(56) References Cited

U.S. PATENT DOCUMENTS

| 183,231 A | 10/1876 | Tomiska |
| 1,454,367 A | 10/1921 | Yardley |
| 1,032,194 A | 5/1923 | Evans et al. |
| 2,271,785 A | 2/1942 | Watkins |

(Continued)

FOREIGN PATENT DOCUMENTS

| CA | 2 282 129 | 3/2000 |
| EP | 0 275 242 | 7/1988 |

(Continued)

OTHER PUBLICATIONS

International Search Report for related PCT/FR2002/002844, Jan. 2, 2003.

*Primary Examiner* — John Rivell
(74) *Attorney, Agent, or Firm* — Allen E. White

(57) ABSTRACT

The disclosure relates to a valve with a pivoting lever. This lever pivots around a pivot point and can move between at least three stable positions. In the rest position, this lever is fixed and solidly connected to the body of the valve, and there is zero fluid flow in the internal fluid passage. In the intermediary released position, the axis of the lever is disposed at a positive, non-zero angle in relation to the axis of the lever in the rest position, the lever being now disconnected from the body, but the fluid flow remains zero. In the active position, the axis of the lever is disposed at a positive non-zero angle in relation to the axis of the lever in the intermediary released position, this lever being disconnected from the body, and with fluid now flowing thorough the internal fluid passage at a non-zero rate.

24 Claims, 5 Drawing Sheets

U.S. PATENT DOCUMENTS

| | | | |
|---|---|---|---|
| 2,708,896 A | 5/1954 | Smith et al. |
| 2,697,447 A | 12/1954 | Troy |
| 3,373,894 A | 3/1968 | Johnson |
| 3,510,104 A | 5/1970 | Wilson et al. |
| 4,103,806 A | 8/1978 | White |
| 4,197,915 A | 4/1980 | Martin |
| 4,648,431 A | 3/1987 | Strongert et al. |
| 5,176,298 A | 1/1993 | Mogler et al. |
| 5,429,152 A | 7/1995 | Van Straaten et al. |
| 5,975,121 A | 11/1999 | Arzenton et al. |
| 8,056,580 B2 * | 11/2011 | Lang et al. | 137/557 |

FOREIGN PATENT DOCUMENTS

| | | |
|---|---|---|
| EP | 0 629 812 | 12/1994 |
| EP | 0 747 796 | 12/1996 |
| EP | 0 990 825 | 4/2000 |
| EP | 1 026 438 | 8/2000 |
| FR | 2 801 689 | 6/2001 |
| GB | 723 828 | 2/1955 |
| GB | 2 085 567 | 4/1982 |
| WO | WO 82 01580 | 5/1982 |

* cited by examiner

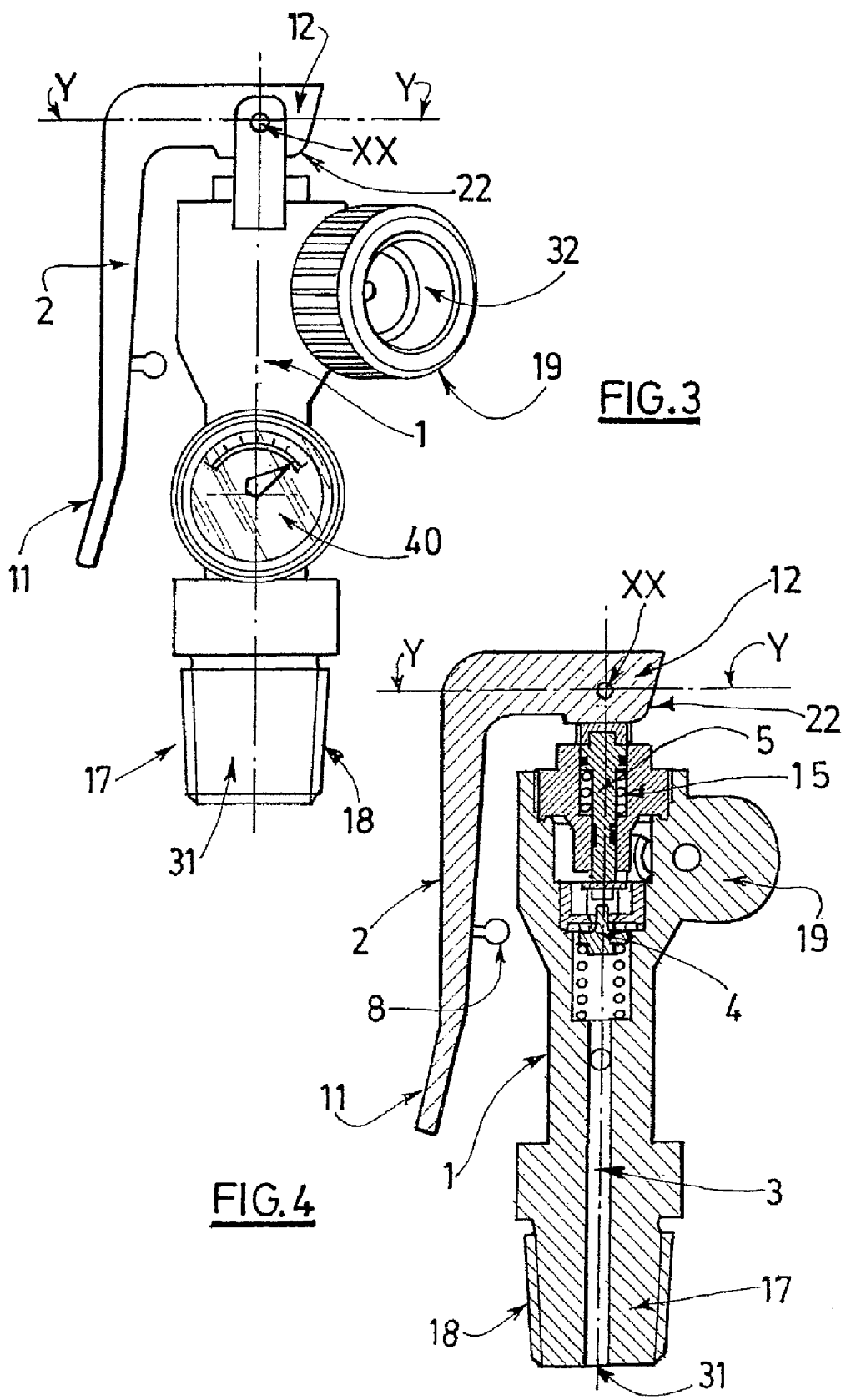

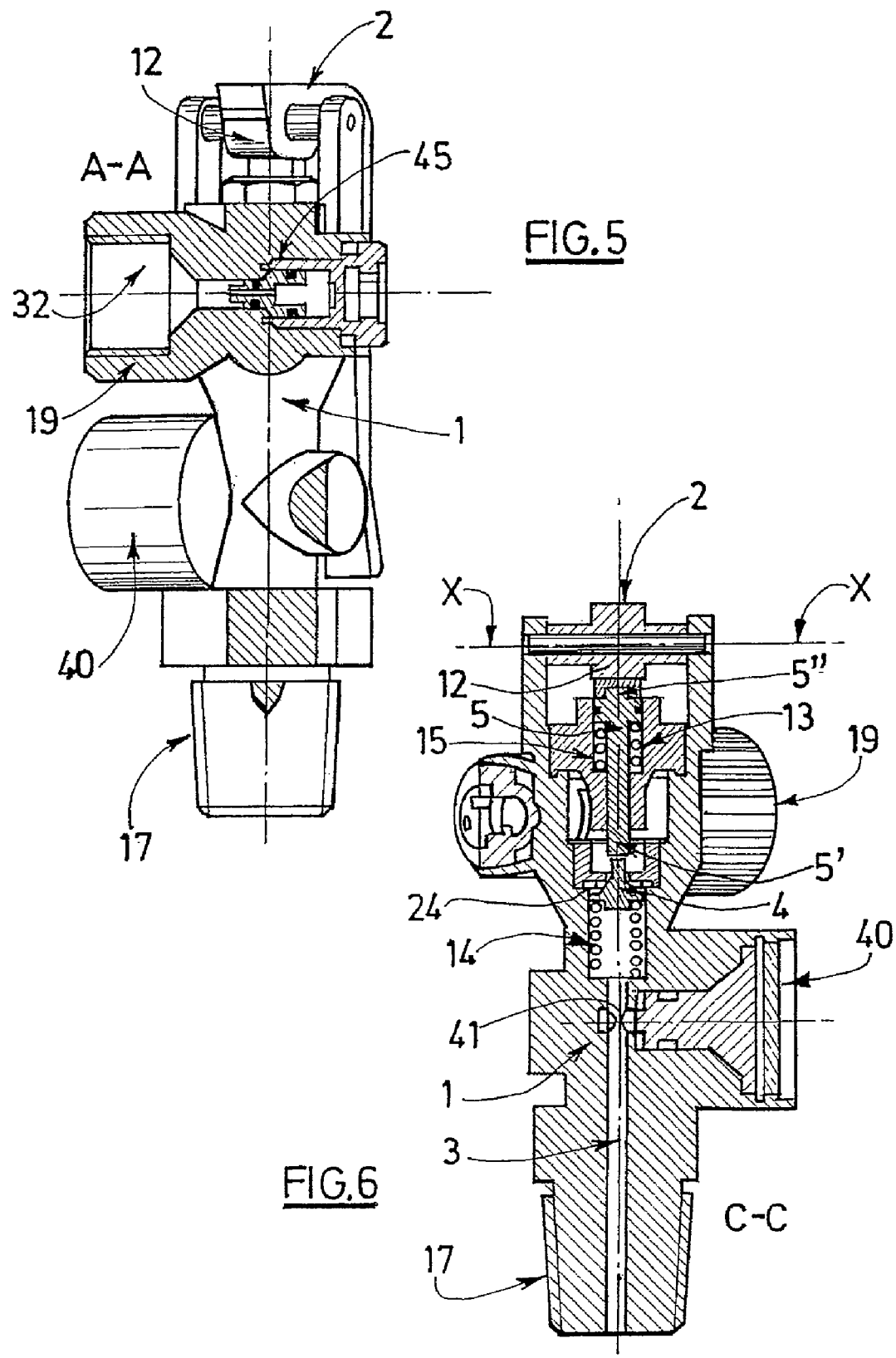

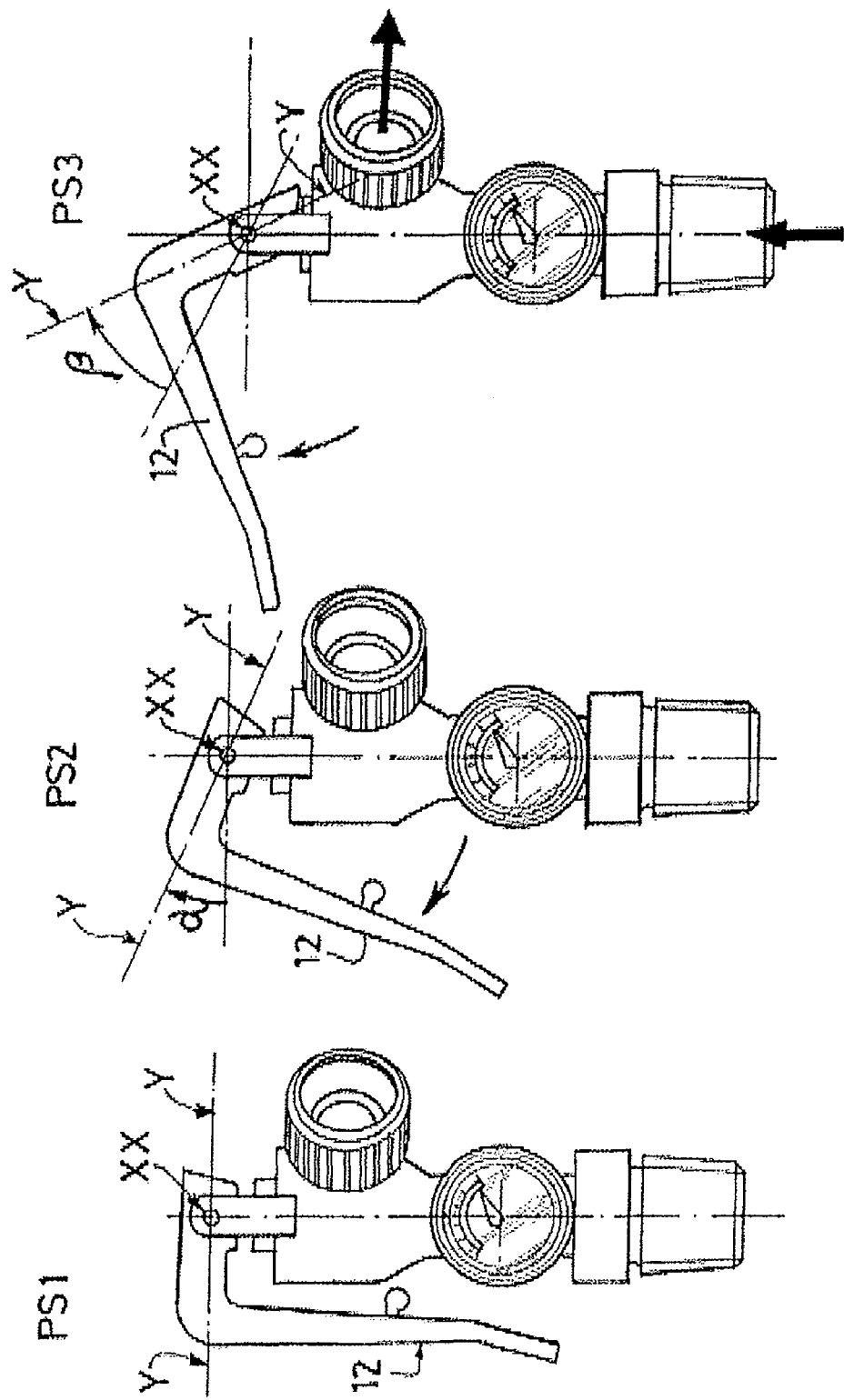

US 8,402,997 B2

FLUID FLOW CONTROL COCK FITTED WITH A LEVER HAVING SEVERAL STABLE POSITIONS

This application is a continuation of Ser. No. 10/487,330, filed Feb. 18, 2004, which is a 371 of international patent application PCT/FR2002/002844, filed Aug. 9, 2002, which claims foreign priority to FR 0111042, filed Aug. 23, 2001.

BACKGROUND OF THE INVENTION

1. Field of the Invention

The present invention relates to a cock for controlling the flow rate of a fluid, particularly a pressurized gas, equipped with a lever pivoting about a pivot axis between at least three stable and angularly offset positions, namely a rest position, a liberating intermediate position and an active position, and to a gas container, such as a pressurized gas cylinder, equipped with such a cock.

2. Related Art

Industrial and medical gases are usually packaged in containers such as gas cylinders in which the gas is kept under a pressure that may be as high as 200 to 300 bar, or even more.

When there is a desire to use some pressurized gas, it is necessary to extract it from the container in which it was packaged, and to do this, use is made of a device known as a cock that allows the outlet and flow rate of fluid from the container to be controlled.

There also exist cocks that incorporate a pressure-reducing part so that the pressure of the fluid leaving the container can be reduced. These are then known as integrated pressure reducing cock assemblies, such an assembly being described in documents EP-A-747796 or EP-A-275242.

Many known cocks for gas cylinders have a common and very simple architecture, namely they are made up of a cock body, generally made of metal or metal alloy, such as brass, particularly comprising: a threaded base so that it can be fixed onto the neck of a gas cylinder for example; a gas outlet coupling via which the gas can be removed to the site where it is to be used; an internal passage formed in the cock body, fluidically connecting a gas inlet orifice borne by the base and via which the gas leaving the cylinder enters the cock body, and a gas outlet orifice borne by the outlet coupling and via which the gas which is passed through the cock body reemerges from said cock body and is then removed, via a gas line, for example, to its place of use; a system for controlling the flow rate to control the flow rate of gas in the internal passage formed in the cock body; and a manipulating means that can be actuated by an operator and collaborates with the flow rate control system to allow or prevent, as the operator desires, gas from being channeled through the internal passage and therefore from leaving via the outlet coupling.

The assembly comprising the inlet orifice, the internal passage and the outlet orifice is sometimes known as the gas distribution circuit.

Most of the time, the cock body also comprises a gas filling coupling with a fill orifice communicating fluidically, via a filling duct also formed in the cock body, with the internal gas passage so that the cylinder can be filled without having to remove the cock.

The assembly comprising the fill orifice and the filling duct connected to the internal passage is sometimes known as the gas filling circuit.

In most cases, the manipulating means with which existing gas cocks are fitted is or comprises a rotary hand wheel that can be operated by hand by the operator by turning it about its longitudinal axis, that is to say that a screwing-in operation performed by the operator on the hand wheel will partially or completely interrupt the flow rate of gas in the internal passage of the body by shutting off this internal passage via the flow rate control system, whereas a screwing out operation performed on the hand wheel will allow a partial or total flow rate of gas along the internal gas passage.

Such operating hand wheels are described in particular in the following documents: U.S. Pat. No. 4,103,806, EP-A-629812, WO-A-82/01580.

Furthermore, certain cocks or assemblies comprising cocks with inbuilt expansion valves comprise a manipulating means consisting of a lever pivoting about a pivot axis comprising a manipulating end allowing the lever to be grasped manually by the operator so that it can be pivoted angularly, and an active end, bearing the pivot axis, collaborating directly or indirectly with the system for controlling the flow rate of the gas so as to allow or, conversely, prevent, gas from being conveyed along the internal gas passage between the inlet orifice and the outlet orifice borne by the outlet coupling.

Such devices with manipulating levers are described in particular in the following documents: EP-A-747796, EP-A-990825, FR-A-2801689, EP-A-1026438 and GB-A-723828.

The use of a pivoting lever rather than of a rotary hand wheel has the particular advantage that it is quicker for the user to manipulate.

In addition, the position of the lever immediately reflects the status of the cock, that is to say the lever in the rest position corresponds to the passage of gas being interrupted, whereas the lever in the active position corresponds to the passage of gas. This avoids or minimizes the risk that the operator will make a mistake by increasing the safety of use.

The object of the present invention is to improve cocks of the lever-operated type.

Specifically, in existing lever-operated cocks, the lever usually pivots between two angularly offset stable positions, namely:

a first position known as the "rest position" in which the conveying of gas through the distribution circuit of the cock body is completely interrupted; and a second position known as the "active position" or "gas release position" in which the conveying of gas through the distribution circuit of the cock body is allowed, that is to say is no longer interrupted.

The switch from the rest position to the active position is accomplished by the operator pivoting the lever from its first angular position corresponding to the rest position of the lever into the second angular position corresponding to the active position.

Actuation of the lever gives rise to direct or indirect collaboration of the lever via its active end, with the gas flow rate control system in order to allow gas to pass through the passage opening which was hitherto shut off by the gas flow rate control system.

Furthermore, the switch from the active position to the rest position is accomplished by the operator operating the lever the other way.

This is clearly explained in document EP-A-747796 which discloses a pressure reducing cock with a pivoting lever pivoting between two extreme positions, open or closed, in which positions the lever is held stably and in a way that is practically insensitive to vibration.

Now, it has been found that, in order to better hold the lever in the rest position so as to ensure an effective shutting-off of the gas flow, it was desirable to hold the lever secured to the cock body by appropriate fixing means so as to avoid unwanted opening of the gas passage by unintentional actuation of the lever.

From there, a proposal was made to give the lever a catching mechanism allowing it to be secured to the cock body, thus guaranteeing a zero gas flow rate in the internal gas passage when the lever is held in its rest position.

However, in practice, it was found that with such a catching mechanism, problems could arise when moving from the rest position to the active position.

Specifically, if the catching mechanism holds the lever too firmly secured to the cock body then the operator may experience difficulty in detaching it when he wishes to pivot it and open the gas supply, and this may cause the operator to manipulate the lever excessively violently and cause excessively rapid opening of the gas flow, this being accompanied with the usual risks and problems that result from excessively sharp handling of pressurized gas. This disadvantage is accentuated all the more if the lever is attached to and held in the rest position very close to the cock body because then the space for the operator's hands or fingers may not be sufficient, especially if he is wearing working gloves.

Conversely, if the catching mechanism does not hold the lever sufficiently, then it will not play its part correctly.

The object of the invention is therefore to propose an improved lever-operated cock that allows the problem encountered when switching from the rest position to the active position to be solved, particularly when the lever is secured to the cock in its rest position by a catching mechanism.

SUMMARY OF THE INVENTION

The solution of the invention is therefore a cock for controlling the flow rate of a pressurized fluid, particularly a gas, comprising a cock body comprising:
- an internal fluid-distribution circuit comprising a fluid inlet orifice, a fluid outlet orifice and an internal fluid passage fluidically connecting the fluid inlet orifice to the fluid outlet orifice,
- fluid flow control means acting on the internal fluid passage to allow or prevent fluid from flowing along said passage between the fluid inlet orifice and the fluid outlet orifice,
- manipulating means that can be actuated manually by an operator and collaborating directly or indirectly with the fluid flow control means to allow or to prevent said circulation of fluid along said passage, and in which the manipulating means comprise a lever of axis (YY) pivoting about a pivot axis (XX) and able to move between at least three stable and angularly offset positions, said three stable positions being at least:
- a rest position in which the lever is held, directly or indirectly, fixed and secured to the body of the cock and in which the fluid flow control means completely shut off the internal fluid passage so as to obtain a zero fluid flow rate in said internal fluid passage,
- a liberating intermediate position in which the axis (YY) of the lever is offset by a positive and non-zero angle α with respect to the axis (YY) of the lever in the rest position, in which position the lever is detached from the body of the cock and in which position the fluid control means completely shut off the internal fluid passage so as to provide a zero fluid flow rate in said internal fluid passage, and
- an active position in which the axis (YY) of the lever is offset by a positive and non-zero angle β with respect to the axis (YY) of the lever in the liberating intermediate position, in which position the lever is detached from the body of the cock and in which position the fluid flow control means no longer shut off the internal fluid passage so as to allow fluid to circulate at a non-zero flow rate along said internal passage.

A stable position is to be understood as meaning an angular position with respect to the axis (XX) in which the axis (YY) of the lever is in equilibrium, that is to say that it holds itself or is held in this position in a way that is lasting without perceivably deflecting from this position.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 3 illustrates a side view of an apparatus in accordance with one illustrative embodiment of the present invention.

FIG. 4 illustrates a view in section on B-B depicted in FIG. 2 in accordance with one illustrative embodiment of the present invention.

FIG. 5 illustrates a view in section A-A of FIG. 2 in accordance with one illustrative embodiment of the present invention.

FIG. 6 illustrates a view in section C-C of FIG. 2 in accordance with one illustrative embodiment of the present invention.

FIGS. 8A, 8B, and 8C illustrate a side view of an apparatus in rest position, in the liberating intermediate position, and in the active position in accordance, respectively, with one illustrative embodiment of the present invention.

DESCRIPTION OF PREFERRED EMBODIMENTS

Figure 1:
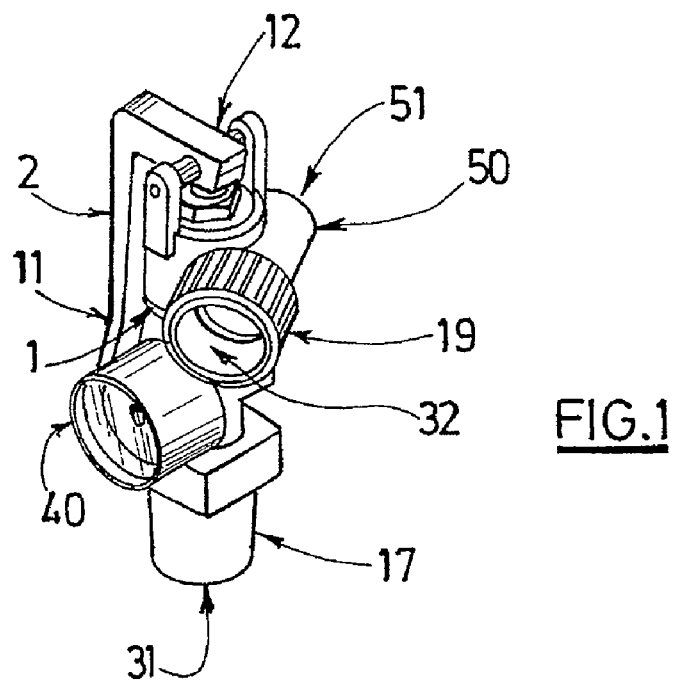
FIG. 1 illustrates a three-dimensional view of an apparatus in accordance with one illustrative embodiment of the present invention.

The cock of the invention may have one or more of the following technical features as the case may be:
- the fluid flow control means comprise a shut-off means allowing the internal fluid passage to be shut off, preferably the shut-off means is a shutter normally pushed back against its valve seat by an elastic means such as a spring.
- the pivoting lever comprises a manipulating end via which the operator can manually grasp the lever, and an active end situated on the same side as the pivot axis (XX), collaborating directly or indirectly with the shut-off means for shutting off the internal fluid passage.
- the pivoting lever collaborates, via its active end, with the fluid flow control means (4) by way of at least one moving part able to move in translation in a housing situated between said active end of the lever and the shut-off means shutting off the internal fluid passage.
- the cock body is covered with an external structure forming peripheral cladding for said body, said external structure being secured to the body, and in that, in the rest position, the lever is held indirectly secured to the body of the cock by being fixed to the external structure by way of catching means.

in the rest position, the lever is secured to the body of the cock by way of catching means while at the same time being kept fixed to said body or to an external structure forming peripheral cladding of said body or a connecting piece borne by said body.

in the liberating intermediate position, the axis (YY) of the lever is angularly offset by an angle of between 10° and 70° to the axis (YY) of said lever in the rest position, preferably by an angle α of between 20° and 50°.

in the active position, the axis (YY) of the lever is offset by an angle β of between 20° and 150° to the axis (YY) of said lever in the liberating intermediate position, preferably by an angle β of between 30° and 120°.

when the lever is pivoted from the liberating intermediate position into the active position, the active end of the lever, situated on the same side as the pivot axis (XX), comprising a cam-forming portion, collaborates with the shut-off means for shutting off the internal fluid passage by way of the moving part able to move in translation in the housing by exerting, via the cam-forming part, a pressure force on the moving part so as to cause said moving part to move in translation in the direction that tends to move said moving part away from said cam-forming part so as to allow a flow rate of fluid to circulate in the internal fluid-distribution circuit.

the fluid inlet orifice is borne by a base of the body comprising a peripheral external screw thread and the fluid outlet orifice is borne by a fluid outlet coupling.

it further comprises a pressure gauge connected to the internal fluid distribution circuit by a pressure tapping formed in the body in such a way as to cause said pressure gauge said internal fluid-distribution circuit to communicate fluidically.

it further comprises a filling coupling comprising a fill orifice in fluidic communication with the internal fluid-distribution circuit by way of an internal fluid-distribution circuit filling circuit.

it further comprises a rigid external structure forming peripheral cladding for at least part of the cock, said structure being borne by and secured to said body, preferably the rigid external structure forming peripheral cladding is formed of a shaped and cured polymer material.

in the rest position, the lever is kept secured to the rigid external structure forming peripheral cladding by way of catching means comprising a spherical head borne by the lever and a complementary receptacle borne by the external structure sized and shaped to accommodate and hold securely within it the spherically-headed stud borne by the lever.

The invention also relates to a pressurized-fluid container equipped with a cock according to the invention, preferably the container is a gas cylinder.

The cock of the invention is particularly well suited to use in the field of welding to contain gas at pressures in excess of 100 bar, typically between 150 and 350 bar, but may also be used in the fields of special gases (laboratory, calibration, etc), in the medical, electronic and foodstuffs fields, etc.

The cock of the invention has numerous advantages, particularly improved ease and comfort of use and speed of opening and of closing without risk, and therefore in complete safety.

One embodiment of the cock of the invention will now be described in greater detail with reference to the attached figures.

FIG. 1 depicts a three-dimensional view of one embodiment of a cock according to the invention, where there can be seen the body 1 of the cock, generally made of metal or metal alloy, such as brass, with a base 17 intended to be fixed by way of a peripheral external screw thread 18 onto a gas cylinder, for example, the base 17 bearing a fluid inlet orifice 31 allowing pressurized gas to enter the body 1, which conveys it, via an internal gas-distribution circuit 3, 31, 32, as far as the outlet orifice 32 borne by the outlet coupling 19, to which a user connector may be coupled.

The body 1 also comprises a pressure gauge 40 connected to the internal fluid distribution circuit 3, 31, 32 by a pressure tapping 41 formed in the body 1 so as to cause said pressure gauge 40 and the internal passage 3 of the internal fluid-distribution circuit to communicate fluidically and thus allow the pressure of the gas flowing through the cock body 1 to be measured and indicated as detailed in FIG. 6.

The body 1 further comprises a filling coupling 50 comprising a fill orifice 51 in fluidic communication with the internal distribution circuit 3, 31, 32 by way of a filling circuit and allowing the cylinder, when empty, to be filled with pressurized gas and for this to be done without there being a compulsory need to remove the cock from the container on which it is mounted.

Figure 2:
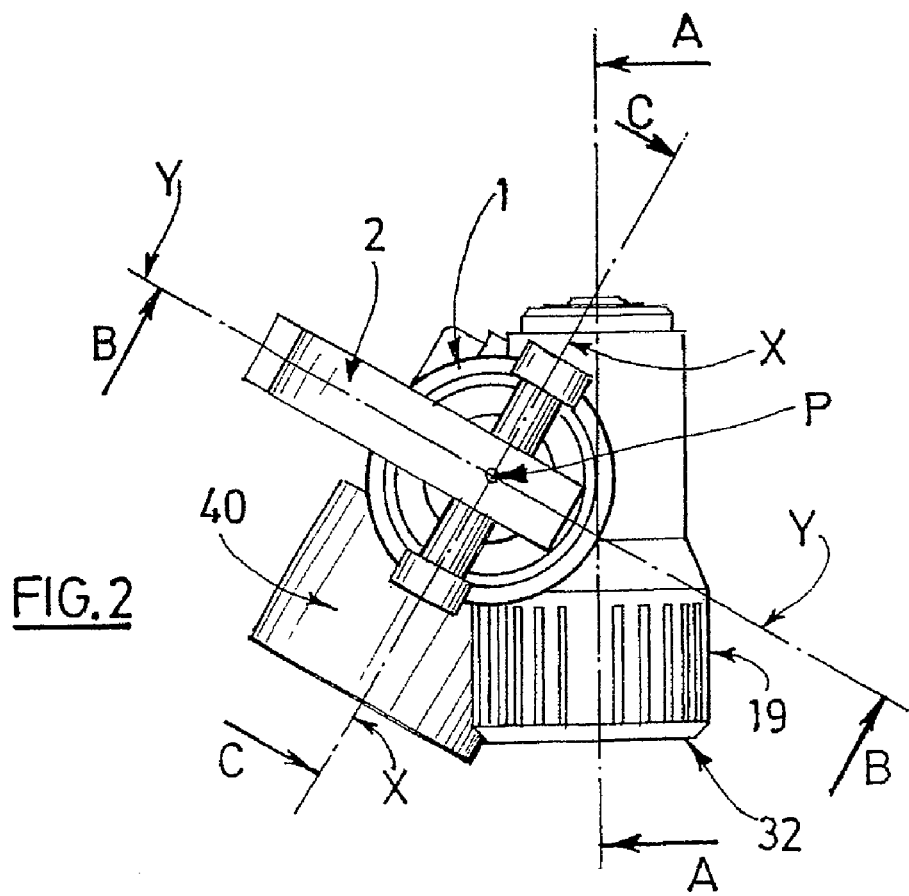
FIG. 2 illustrates a view from above an apparatus in accordance with one illustrative embodiment of the present invention.

FIG. 2 is a view from above of the cock of FIG. 1 and FIG. 3 is a side view of the cock of FIG. 1.

FIG. 4 is a view in section on B-B depicted in FIG. 2 showing in detail the fact that the body 1 comprises an internal fluid-distribution circuit 3, 31, 32 comprising a fluid inlet orifice 31 borne by the base 17, a fluid outlet orifice 32 borne by the outlet coupling 19 and an internal fluid passage 3 fluidically connecting the inlet orifice 31 to the outlet orifice 32 serving to convey the gas inside the body 1.

Fluid flow control means 4 act on the internal fluid passage 3 to allow, or, conversely, prevent, any circulation of gas along the passage. These flow control means 4 conventionally comprise a shut-off means, such as a moving shutter normally pushed back against a valve seat formed on the internal gas passage 3 by an elastic means, such as a spring.

According to the invention, the body 1 of the cock of the manipulating means comprising a lever 2 that can be operated manually by an operator, collaborate directly or indirectly with the fluid flow control means to allow or prevent the circulation of fluid along said passage by acting directly or indirectly on said shutoff means 4.

More specifically, the manipulating means comprise a lever 2 of principal axis YY, pivoting about a pivot axis XX, which lever is able to move and be moved between at least three stable and angularly offset positions (PS1 to PS3) as shown in FIGS. 8A, 8B, and 8C, namely:

a first stable position (PS1, shown in FIG. 8A) known as the rest position, in which the lever 2 is held, directly or indirectly, fixed and secured to the body 1 of the cock and in which the flow control means 4 completely shut off the internal passage 3 so as to obtain and maintain a zero fluid flow rate in said internal passage 3, that is to say in this rest position the lever 2 is immobilized in the rest position and the gas does not flow along the internal gas circuit.

a second stable position (PS2, shown in FIG. 8B) known as the liberating intermediate position, in which the axis YY of the lever 2 is offset by a positive and non-zero angle α, for example an angle α of the order of 30 to 45°, to the axis YY of the lever 2 when the latter is in its rest position, the vertex of the angle α being the point P of intersection of the axis XX with the axis YY as shown in FIG. 2. In this position, the lever 2 is detached from the body 1 of the cock, that is to say freed from said body, but the fluid flow control means 4 continue to perform their part by completely shutting off the internal passage 3. In other words, even though the lever 2 has been moved angularly in a circular arc of angle α, in this second stable position the lever 2 still does not act on the flow control means 4 and these therefore continue to prevent any circulation of fluid along the passage 3 toward the outlet orifice 32, that is to say that the shutter 4 is still pushed back against its seat, thus shutting off the passage 3.

a third stable position (PS3, shown in FIG. 8C) known as the active position, in which the axis YY of the lever 2 is offset by a positive and non-zero angle β, for example by an angle of 20° to 100° from the axis YY of the lever 2 in its liberating intermediate position. In the active position, the lever 2 is detached from the body 1 of the cock and the fluid flow control means 4 no longer shut off the internal fluid passage 3, and this allows gas to circulate at a non-zero flow rate along said internal passage 3.

The axis XX is defined as being the axis of pivoting of the lever 2 on the body 1 of the cock, as illustrated in FIG. 2.

Furthermore, the position of the lever 2 at rest serves as a reference for defining the starting axis YY and the angles α and β. For greater simplicity, the axis YY will be chosen as shown in FIG. 2, the axes; however, in order to define the axis of the lever 2, it would also be possible to choose some other straight line passing through the point P and perpendicular to the pivot axis XX because the most important thing is always to use the same frame of reference in terms of axes.

FIG. 5 is a diagram in section on A-A of FIG. 2, showing the architecture of the gas outlet coupling 19 bearing the outlet orifice 32. This figure also shows a shutter 45 that can move in terms of translation.

Furthermore, FIG. 6 is a diagram in section on C-C of FIG. 2, providing an understanding of how the lever 2 collaborates with the flow control means, particularly the shutter 4, by way of the moving part 5 able to move in its housing 15, which is normally pushed back in the direction of the active end 12 of the lever 2 under the influence of an elastic pushing force which is imparted to it by a sprung means 13 arranged in the housing 15.

More specifically, when the operates manipulates the lever 2 to move it from the first angular position known as the rest position to the second angular position known as the intermediate liberating position, the active end 12 of the lever 2 does not exert pressure (or alternatively exerts very light pressure) on the moving part 5 which therefore remains in position and the shutter 4 remains firmly against its seat 24 under the influence of the pushing force imparted by the spring 14, thus keeping the gas passage 3 shut off.

By contrast, when the operator manipulates the lever 2 to move it from the second angular position known as the intermediate liberating position into the third position known as the active position, the active end 12 of the lever 2 which pivots about the axis XX acts, in the manner of a cam, on the upstream end 5" of the moving part 5, exerting thereon a pressure force stronger than the opposite force of the spring 13, thus causing the moving part 5 to move in translation in its housing 15, compressing the spring 13. This movement of the moving part 5 then causes the shutter 4 to move off its seat 24 under the influence of the pressure force imparted to said shutter by the downstream end 5' of the moving part 5, this pressure force being stronger than the opposing force of the spring 14. The lifting of the shutter 4 off its seat will then liberate the passage 3 and thus allow the gas to flow toward the outlet orifice 32 of the coupling 19.

As a preference, the cock body 1 is covered with an external structure 25 forming partial or complete peripheral cladding of said body 1 and secured to said body 1, being fixed thereto. The rigid external structure 25 is formed for example of several subparts made of a shaped and cured polymer, for example two rigid plastic half shells assembled together to clad the body 1 of the cock in order to give it a shape that is pleasant to look at (design).

Figure 7:
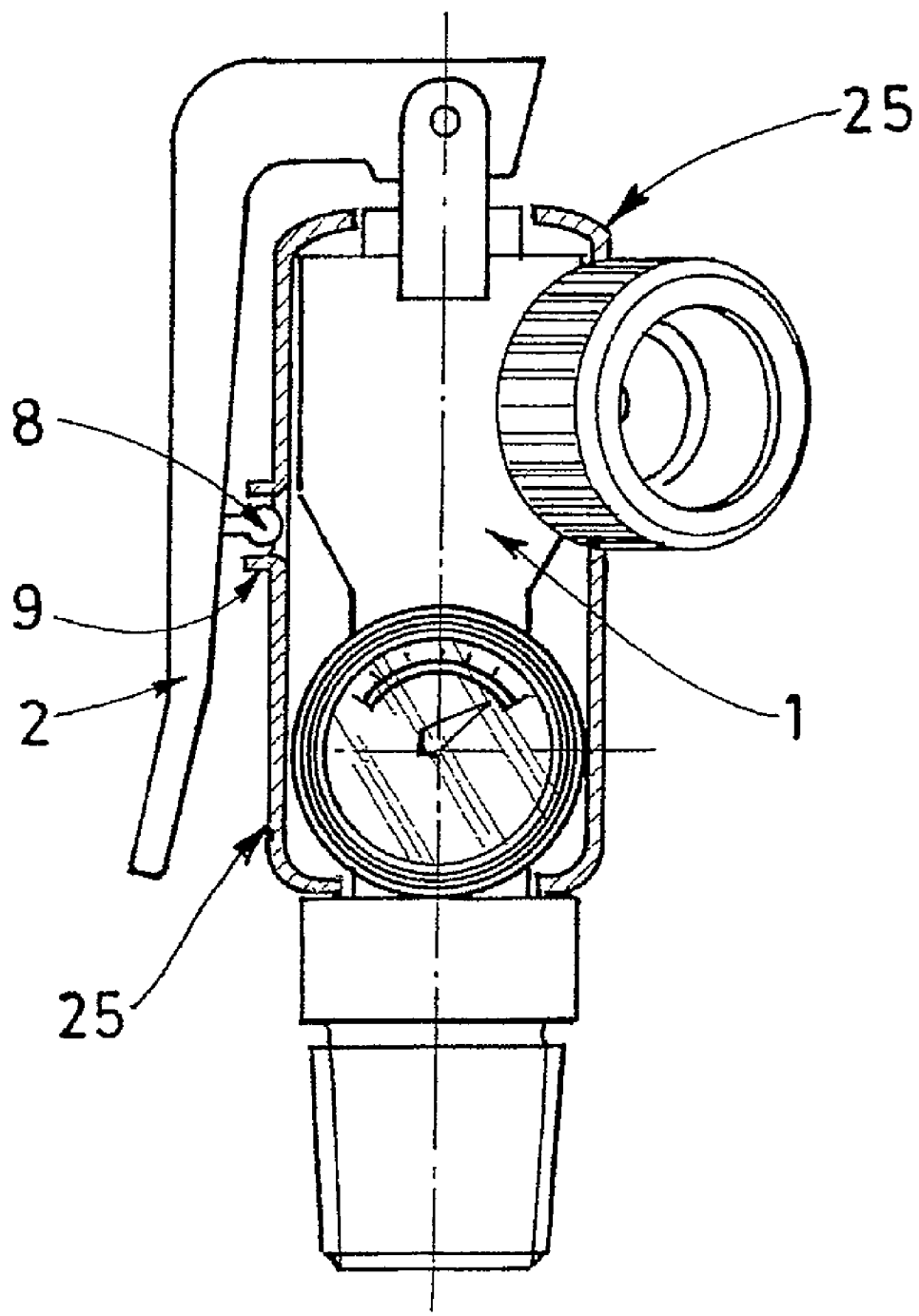
FIG. 7 illustrates a side view of an apparatus in rest position in accordance with one illustrative embodiment of the present invention.

As shown schematically in FIG. 7, in the rest position, the lever 2 is kept indirectly secured to the body 1 of the cock by being fixed to said external structure 25 (sectioned view in FIG. 7) by way of catching means 8, 9 comprising a stud with a spherical head 8 borne by the lever 2 and a complementary stud receptacle 9, such as a housing, borne by the external structure 25 and sized and shaped to accommodate and hold securely within it said spherically-headed stud 8 borne by the lever 2.

In the rest position, the spherically-headed stud 8 of the lever 2 fits firmly into the complementary stud receptacle 9 so as to hold the lever firmly in its rest position and thus prevent any unwanted or accidental opening of the flow rate.

Conversely, in the intermediate position and in the active position, the stud 8 is disengaged from the complementary receptacle 9, and this allows the lever to pivot.

The cock of the invention can be used on gas cylinders but may also be used on other pressurized gas containers or receptacles, and to equip a fluid pipeline or network of pipelines.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus for controlling the flow rate of a pressurized fluid, comprising:
   a) a body, said body comprising an internal fluid-distribution circuit, a fluid flow control device, and a manipulating device;
   b) said internal fluid-distribution circuit comprising a fluid inlet orifice, a fluid outlet orifice and an internal fluid passage fluidically connecting said fluid inlet orifice to said fluid outlet orifice, wherein said fluid inlet orifice is borne by a base of said body comprising a peripheral external screw thread having a screw thread axis and said body extends in a longitudinal direction along said screw thread axis;
   c) said fluid flow control device configured to be capable of acting on said internal fluid passage to permit or prevent fluid from flowing along said passage between said fluid inlet orifice and said fluid outlet orifice;
   d) said manipulating device being adapted for manual actuation by an operator and configured to collaborate directly or indirectly with said fluid flow control device to permit or to prevent said flowing of fluid along said passage, said manipulating device comprising
      A) a lever with a first axis configured to pivot about a pivot axis and configured to move between at least three stable and angularly offset positions, said positions comprising
         i) a rest position, a liberating intermediate position, and an active position,
         ii) said lever comprising a first leg extending angularly away from a second leg, said first leg terminating in a manipulating end and said second leg terminating in an active end, iii) wherein said lever is configured such that when said lever is in said rest position said first leg extends along said body in said longitudinal direction;

e) said rest position defined by an apparatus configuration wherein said lever is held, directly or indirectly, fixed and secured to said body and in which said fluid flow control device completely shuts off said internal fluid passage so as to obtain a zero fluid flow rate in said internal fluid passage;

f) said liberating intermediate position defined by an apparatus configuration wherein said first axis of said lever is offset by a positive and non-zero first angle with respect to said pivot axis of said lever in said rest position, in which position said lever is detached from said body and in which position said fluid flow control device completely shuts off said internal fluid passage so as to provide a zero fluid flow rate in said internal fluid passage; and g) said active position defined by an apparatus configuration wherein said first axis of said lever is offset by a positive and non-zero second angle with respect to said first axis of said lever in said liberating intermediate position, in which position said lever is detached from said body and in which position said fluid flow control device no longer shuts off said internal fluid passage so as to allow fluid to circulate at a non-zero flow rate along said internal fluid passage.

2. The apparatus as claimed in claim 1, wherein said fluid flow control device comprises a shut-off device adapted to shut off said internal fluid passage.

3. The apparatus as claimed in claim 2, wherein said shut-off device is a shutter.

4. The apparatus as claimed in claim 1, wherein:
a) said manipulating end is adapted for an operator to manually grasp said lever; and
b) said active end is situated on the same side as said pivot axis, and configured to collaborate directly or indirectly with said shut-off device to be capable of shutting off said internal fluid passage.

5. The apparatus as claimed in claim 1, wherein said pivoting lever collaborates, via said active end, with said fluid flow control device by way of at least one moving part adapted to move in translation in a housing situated between said active end of said lever and said shut-off device, the moving part configured to be capable of shutting off said internal fluid passage.

6. The apparatus as claimed in claim 1, further comprising an external structure secured to said body, and wherein, in said rest position, said lever is held indirectly secured to the body by being fixed to said external structure by way of a catching element.

7. The apparatus as claimed in claim 1, wherein, when said lever is in said rest position, said lever is secured to said body by way of a catching element while at the same time being kept fixed to at least one of; said body, an external structure on said body, or a connecting piece borne by said body.

8. The apparatus as claimed in claim 1, wherein, when in said liberating intermediate position, said first angle is between about 10° and about 70° relative to said first axis of said lever in said rest position.

9. The apparatus as claimed in claim 8, wherein said first angle is between about 20° and about 50° relative to said first axis of said lever in said rest position.

10. The apparatus as claimed in claim 1, wherein, when in said active position, said second angle is between about 20° and about 150° relative to said first axis of said lever in said liberating intermediate position.

11. The apparatus as claimed in claim 10, wherein said second angle is between about 30° and about 120° relative to said first axis of said lever in said liberating intermediate position.

12. The apparatus as claimed in claim 5, wherein, the apparatus is configured so that when said lever is pivoted from said liberating intermediate position into said active position, said active end of said lever, situated on the same side as the pivot axis, comprising a cam-forming portion, collaborates with said shut-off device to shut off said internal fluid passage by way of said moving part able to move in translation in said housing by exerting, via said cam-forming portion, a pressure force on said moving part so as to cause said moving part to move in translation in the direction that tends to move said moving part away from said cam-forming portion so as to configure the internal fluid passage to be capable of allowing a non-zero flow rate of fluid to circulate in said internal fluid-distribution circuit.

13. The apparatus as claimed in claim 1, wherein said fluid outlet orifice is borne by a fluid outlet coupling.

14. The apparatus as claimed in claim 1, further comprising a pressure gauge connected to said internal fluid distribution circuit by a pressure tapping formed in said body in such a way as to cause said pressure gauge and said internal fluid passage of said internal fluid-distribution circuit to communicate fluidically.

15. The apparatus as claimed in claim 1, further comprising a filling coupling comprising a fill orifice in fluidic communication with said internal fluid-distribution circuit by way of a filling circuit.

16. The apparatus as claimed in claim 1, further comprising a rigid external structure forming peripheral cladding for at least part of said body, said structure being borne by and secured to said body.

17. The apparatus as claimed in claim 6, wherein the catching element comprises a stud with a spherical head borne by said lever and a complementary receptacle borne by said external structure sized and shaped to accommodate and hold securely within it said spherical head stud borne by said lever.

18. A pressurized-fluid container equipped with an apparatus as claimed in claim 1.

19. A pressurized-fluid container as claimed in claim 18, wherein said pressurized-fluid container is a gas cylinder.

20. An apparatus for controlling the flow rate of a pressurized fluid, comprising:
a) a body, said body comprising an internal fluid-distribution circuit, a fluid flow control device, and a manipulating device;
b) said internal fluid-distribution circuit comprising a fluid inlet orifice, a fluid outlet orifice and an internal fluid passage fluidically connecting said fluid inlet orifice to said fluid outlet orifice, wherein said fluid inlet orifice is borne by a base of said body comprising a peripheral external screw thread having a screw thread axis and said body extends in a longitudinal direction along said screw thread axis;
c) said fluid flow control device configured to act on said internal fluid passage to allow or prevent fluid from flowing along said passage between said fluid inlet orifice and said fluid outlet orifice;
d) said manipulating device adapted to be actuated manually by an operator and collaborating directly or indirectly with said fluid flow control device to allow or to prevent said flowing of fluid along said passage;

e) said manipulating device comprising a lever with a first axis capable of pivoting about a pivot axis and capable of moving between at least three stable and angularly offset positions, said positions comprising a rest position, a liberating intermediate position, and an active position, said lever comprising a first axis and a pivot axis, said lever comprising a first leg extending angularly away from a second leg, said first leg terminating in a manipulating end and said second leg terminating in an active end, wherein said lever is configured such that when said lever is in said rest position said first leg extends along said body in said longitudinal direction; and f) said rest position defined by an apparatus configuration in which said lever is held, directly or indirectly, fixed and secured to said body and in which said fluid flow control device completely shuts off said internal fluid passage.

21. The apparatus as claimed in claim 20, wherein said liberating intermediate position is defined by an apparatus configuration in which said first axis of said lever is offset by a positive and non-zero first angle with respect to said pivot axis of said lever in said rest position, in which position said lever is detached from said body and in which position said fluid flow control device completely shuts off said internal fluid passage so as to provide a zero fluid flow rate in said internal fluid passage.

22. The apparatus as claimed in claim 21, wherein said active position is defined by an apparatus configuration in which said first axis of said lever is offset by a positive and non-zero second angle with respect to said first axis of said lever in said liberating intermediate position, in which position said lever is detached from said body and in which position said fluid flow control means no longer shut off said internal fluid passage so as to allow fluid to circulate at a non-zero flow rate along said internal fluid passage.

23. The apparatus as claimed in claim 22, wherein said pivoting lever collaborates, via said active end, with said fluid flow control device by way of at least one moving part able to move in translation in a housing situated between said active end of said lever and said fluid flow control device to shut off said internal fluid passage; and wherein in said liberating intermediate position, said active end of said lever, does not exert a pressure force on said moving part.

24. The apparatus as claimed in claim 20, wherein said body is covered with a rigid external structure forming peripheral cladding for said body, said rigid external structure being secured to said body, and in that, in said rest position, said lever is held indirectly secured to the body by being fixed to said rigid external structure by way of a catching element.

* * * * *